United States Patent [19]

Appel

[11] Patent Number: 4,756,156
[45] Date of Patent: Jul. 12, 1988

[54] DRIVE SYSTEM WITH TWO HYDROSTATIC GEARS

[75] Inventor: Wilhelm Appel, Ulm-Donaustetten, Fed. Rep. of Germany

[73] Assignee: Hydromatik GmbH, Elchingen, Fed. Rep. of Germany

[21] Appl. No.: 915,156

[22] Filed: Oct. 3, 1986

[30] Foreign Application Priority Data

Oct. 4, 1985 [DE] Fed. Rep. of Germany ....... 3535555
Aug. 20, 1986 [DE] Fed. Rep. of Germany ....... 3628175

[51] Int. Cl.[4] ............................................. F16D 31/02
[52] U.S. Cl. ....................................... 60/426; 60/427; 60/428; 60/444; 60/484; 60/487; 180/6.48
[58] Field of Search ................. 180/6.48; 60/483, 444, 60/428, 427, 426, 487, 484

[56] References Cited

U.S. PATENT DOCUMENTS

| 3,672,161 | 6/1972 | Krusche et al. ................. 180/6.48 |
| 4,553,620 | 11/1985 | Eckhardt et al. ............... 180/6.48 |
| 4,583,371 | 4/1986 | Hoashi et al. .................. 180/6.48 X |
| 4,599,855 | 7/1986 | Seelman ........................... 60/427 X |

FOREIGN PATENT DOCUMENTS

| 1630122 | 5/1971 | Fed. Rep. of Germany . |
| 2152726 | 2/1973 | Fed. Rep. of Germany . |
| 2342450 | 3/1974 | Fed. Rep. of Germany . |
| 2554187 | 6/1976 | Fed. Rep. of Germany . |

OTHER PUBLICATIONS

Nikolaus, H., Hydrostatischer Lenk- und Fahrantrieb fur Kettenfahrzeuge, 1974, 667–670.

Primary Examiner—Edward K. Look
Attorney, Agent, or Firm—Scully, Scott, Murphy & Presser

[57] ABSTRACT

A drive system having two hydrostatic gears (1, 2) driven by a common driving motor or by a plurality of driving motors having a fixed speed ratio, each having a pump (5, 6) and a hydraulic motor (7, 8) and in which the delivery or intake volume setting of the pumps (5, 6) and/or the hydraulic motors (7, 8) is performed by hydraulic servomechanisms (13, 14) of which the control pressures in the control pressure lines (23, 24) can be varied as desired either independently or together by means of pressure indicating valves (26) connected to each of the gears (1, 2) and supplied by an auxiliary source of pressure (9, 10) is arranged so that, at least on starting, the outputs of the gears (1, 2) are as nearly as possible equal. This is done by means of an adjustable differential pressure valve (41) connected to the control pressure lines (23, 24, 25) which is set to compensate for differences in output values of the gears (1, 2) arising from departures from the intended values by a corresponding pressure change in at least one of the control pressure lines.

11 Claims, 6 Drawing Sheets

DRIVE SYSTEM WITH TWO HYDROSTATIC GEARS

TECHNICAL FIELD OF THE INVENTION

The invention relates to a drive system according to the preamble of claim 1.

BACKGROUND OF THE INVENTION AND PRIOR ART

Drive systems of this kind enable the transmission ratio of the gears to be varied continuously over a wide range, both upwards and downwards, and also make optimal steering and driving conditions possible when used in a vehicle, both when driving straight ahead and when turning.

A drive system of the above-mentioned kind is described and illustrated in German Offenlegungsschrift No. 21 52 716. In this design the control pressures acting on the servo-regulating devices are set by adjustable control pressure indicating valves that can be adjusted by a control means, which in the case of a track-laying or caterpillar vehicle is a speed control means and/or a steering means.

However, the known design suffers from the disadvantage that the actual pump deliveries only theoretically correspond to the desired amounts. In practice it is found that the pump deliveries controlling the speed of the gear concerned or the speed of a vehicle differ from the desired values. This defect arises from sources of error in the characteristics of the determination of the delivery amounts, which are mainly determined by the movement of the servo-regulator and cannot be wholly avoided by acceptable means. In particular what are involved are departures from intended values arising from manufacturing tolerances, e.g. differences in the tensions of the springs used and differences in dimensions, particularly of the control edges of the indicating valves in the servo-regulators, differences in frictional losses of the moving parts of the gear, especially of the servo-regulators, different deliveries caused by manufacturing tolerances and/or leakage losses in the pumps and the like. Differences in the intake volumes of the hydraulic motors arising from manufacturing tolerances and/or leakage losses also contribute to the above-mentioned sources of error.

The above-mentioned defect is made particularly apparent in the case of the known design through the output speeds of the gears not corresponding exactly to the desired values. This is not so important when driving, since the resulting driving direction can be corrected by the steering means. Problems arise when driving if the steering means can be fixed in a position that corresponds to movement straight ahead, since when the steering means is in this position the vehicle does not move precisely straight ahead.

The defect in the known design becomes particularly apparent on starting and shows up in the case of a vehicle by a jerk to one side, since the driving means of the vehicle are acted upon in different ways.

OBJECT OF THE INVENTION

The object of the invention is to design a drive system of the above-mentioned kind so that the outputs of the gears are as nearly equal as possible, particularly on starting.

SUMMARY OF THE INVENTION

This problem is solved by the characterising features of claim 1.

The design according to the invention has a regulator that corrects the action of the servo-regulator of at least one gear having regard to the above-mentioned sources of error that cause differing outputs at the gears. As a result uniform outputs are obtained from the gears, so that when the invention is used in a vehicle the direction and speed of movement correspond to the values set by the appropriate control means. With the design according to the invention there is no sideways jerk on starting, since the driving means (tracks, wheels) of the vehicle are acted upon uniformly. The solution according to the invention is thus distinguished both by operational reliability and also by simplicity.

According to the invention the regulator comprises a differential pressure valve that corrects at least one of the control pressures that act simultaneously on the servo-regulator having regard to the other control pressure, and thus, taking into account the sources of error, effects a different action on the servo-regulator. Because the differential pressure valve is adjustable it is simple to take account of the sources of error, since the differential pressure valve can be adjusted after mounting in position, i.e. on the spot.

The control pressure difference set up by the differential pressure valve can be either constant or variable, according to the source of error. The arrangement according to claim 2 gives the possiblity first of fine adjustment of the differential pressure valve and second of simple adaptation to different pressure differences and spring strengths.

The arrangement in claim 3 represents a differential pressure valve of simple construction that corrects the control pressure of one of the two control pressure lines that are in use at the same time.

In the arrangement according to claim 4 the differential pressure valve is fitted in the common control pressure line, using a double-action differential pressure valve that acts simultaneously as a flow and/or pressure divider. With this solution the control pressures in each of the two control pressure lines in use at the same time can be corrected.

The features of the arrangement according to claim 5 give a double-acting differential pressure valve of simple and practical construction.

On the basis of the arrangement according to claim 6 it is possible to perform a correction of the control pressure flow at the differential pressure valve that corresponds to the departures from the intended delivery or intake volumes caused by differing spring characteristics, so that the delivery or intake volume setting finally corresponds to the intended value, or at least to a mean value of the departures occurring from the intended value. This is achieved by means of a regulator that converts the control pressure into mechanical work and transmits this work having regard to its path ratio. That is to say, what is variable is not only the force acting on the piston slide of the differential pressure valve in the direction opposite to the spring, but also the control path opposed to the spring in the valve, so that compensation in the delivery or intake volume setting is at least approximately achieved. By reason of the adjustability of the transmission gear it is possible for the differential pressure valve according to the invention to at least approximately eliminate on the spot the departures from the delivery or intake volume settings arising from different slopes of the spring characteristics. If several springs are used in setting the delivery or intake volume, a mean error value results that can be compensated by the differential pressure valve according to the invention.

The arrangements according to claims 7 to 9 lead to simple and practical embodiments of the adjustable transmission device in the form of a lever gear.

The features in claims 10 to 12 lead to a simple construction of the differential pressure valve whereby, according to claims 11 and 12, centering of the piston slide is achieved.

BRIEF DESCRIPTION OF THE DRAWINGS

The invention will now be explained in more detail with reference to preferred embodiments shown in simplified drawings, in which.

DETAILED DESCRIPTION OF PREFERRED EMBODIMENTS OF THE INVENTION

Figure 1:
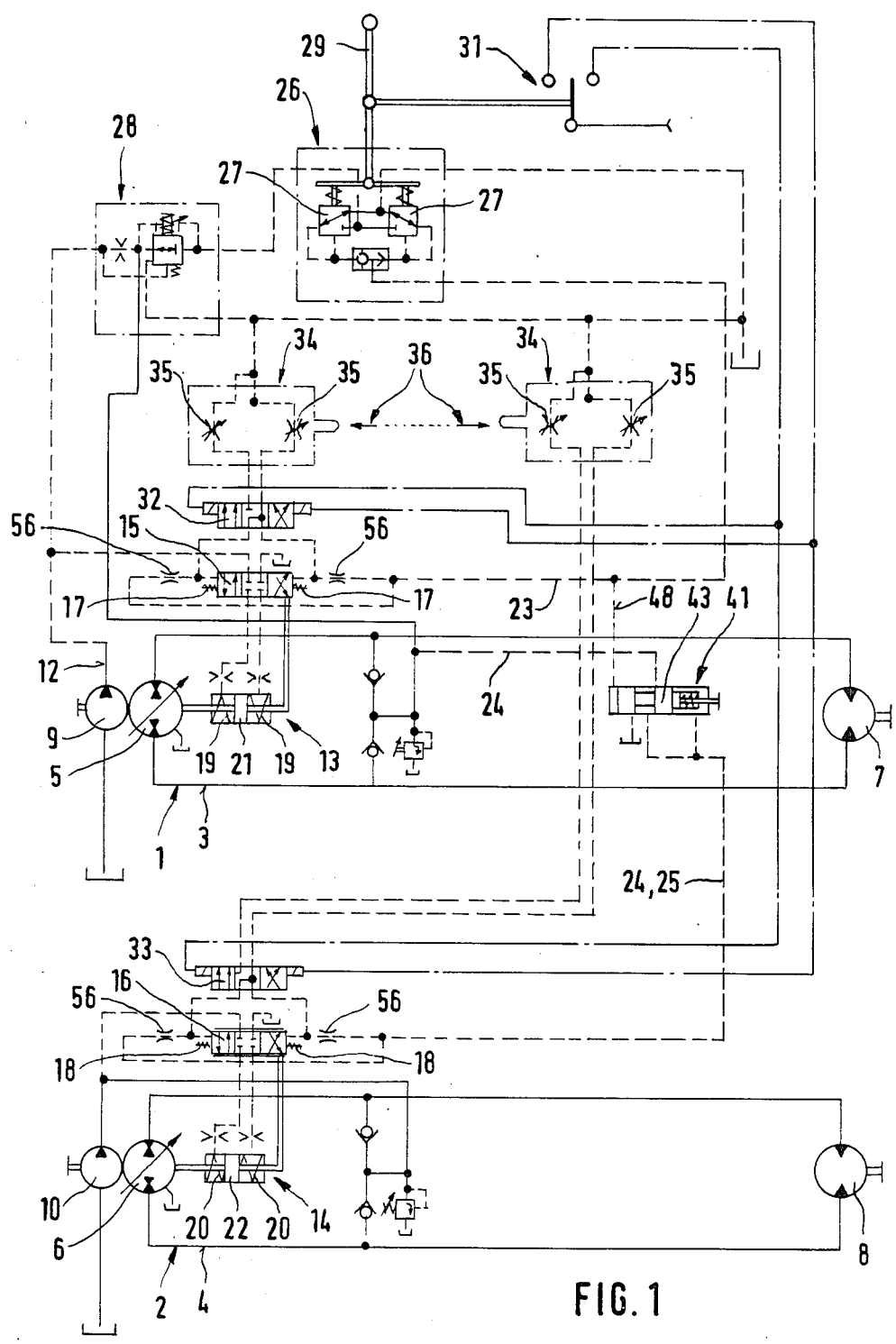
FIG. 1 shows a circuit diagram of a first embodiment of a drive system according to the invention.

The drive system shown diagrammatically in FIG. 1 comprises two hydrostatic gears 1, 2 having closed circuits 3, 4 in each of which is fitted a pump 5, 6 of adjustable and reversible delivery and a hydraulic motor 7, 8 of reversible direction of rotation. The pumps 5, 6 are driven by a common driving motor (not shown) that also drives two auxiliary pumps 9, 10 each of which supplies a control circuit 12 fitted to one of the gears.

Each pump 5, 6 is fitted with a servo-regulator 13, 14 that can be controlled by a spring-centered 4/3-way valve 15, 16 of which the springs are designated as 17, 18. The servo-regulators 13, 14 comprise a hydraulic cylinder having double-acting pistons 21, 22, centered by springs 19, 20 and acted upon by the respective pumps 5, 6 in order to change the amount and direction of delivery.

Each of the 4/3-way valves 15, 16 is connected to its own control pressure line 23, 24. In the control pressure line 23 the pressure is the secondary pressure of a pressure reducing valve 26 in the control circuit 12, and in the control pressure line 24 the pressure is the primary pressure of the control circuit. In front of the pressure reducing valve 26 is fitted a control valve indicated generally by 28, the construction and arrangement of which correspond to the control valve described in German patent specification No. 22 47 437.

The present drive system is intended for driving the two tracks of a track-driven construction vehicle. Each gear 1, 2 drives one track (not shown). To control the speed of the vehicle a control means 29 is provided that is moveable in two directions, is integrated in the pressure reducing valve 26 and serves to act on the control pressure indicating valve 27. The control means 29 is connected to an electric switch 31 that controls the electrical operation, corresponding to the two directions of movement of the control means 29, of two 4/3-way valves 32, 33, each fitted to one of the 4/3-way valves 15, 16, for preselection of forward or reverse drive.

The control pressures in the control pressure lines 23, 24 are each controllable, independently of the pressure reducing valve 26, by a control valve 34 having adjustable chokes 35 in the drain of the control circuit 12 and by steering means 36, indicated only generally, that cooperates with the adjustable chokes to enable the vehicle to turn. For this purpose the servo-regulators 13, 14 are set differently so that different speeds result at the output of the gears 1, 2, whereby the vehicle is caused to travel in a corresponding curve.

Figure 2:
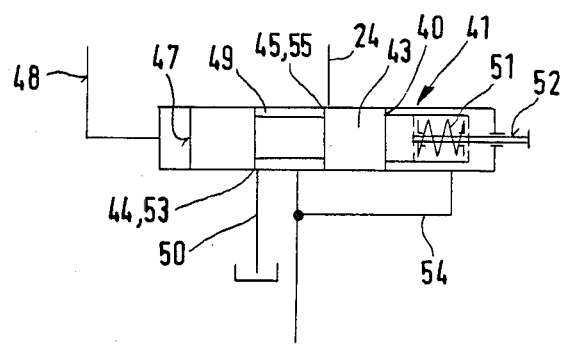
FIG. 2 shows a differential pressure valve according to FIG. 1 on a larger scale.

In the control pressure line 24, which in the present arrangement holds the higher control pressure (primary pressure), there is fitted a differential pressure valve 41 which, as is clearly shown on a larger scale in FIG. 2, comprises a piston slide 43 that has two control edges 44, 45 and is moveable in a cylinder 42. One end face of the piston slide 43 forms a measuring surface 47 acted on by the control pressure in the control pressure line 23 through a line 48 connected to the control pressure line 23. Connected to the recess 49 in the piston between the control edges 44, 45 are the control pressure line 24 and a drain line 50, forming adjustable chokes 53, 55 with the control edges 44, 45. Acting against the face 40 of the piston slide 43 opposite the measuring face 47 is a pressure spring 51 of which the pretension can be reduced or increased as desired by a control means 52. The working space in front of this face 40 of the piston slide 43 which accommodates the pressure spring 51 is connected via a line 54 to the control pressure line 24 so that the control pressure in the control pressure line 24 acts on the end face 40. It should be added that the control pressure lines 23, 24 are connected to the 4/3-way valves 15, 16 via chokes 56.

The purpose of the differential pressure valve 41 is to provide a pressure difference between the primary pressure in the line 24 and the control pressure in the section 25 of the control pressure line 24 leading to the 4/3-way valve, and thus to correct the pressure difference between the control pressure lines 23, 25. The pressure difference between the control pressures can be varied by changing the tension of the pressure spring 51 by the control means 52.

By correcting the control pressure difference the errors in the deliveries from the pumps 5, 6 and in the drive of the hydraulic motors 7, 8 that arise from departures from intended values can be compensated. The departures from the intended values concerned are not entirely avoidable by acceptable means, e.g. differences in mechanical and hydraulic frictional losses in the servo-regulators 13, 14, particularly in their control slides, and in the pumps 5, 6 and hydraulic motors 7, 8, different tensions in the springs 17 to 20, different dimensions of the control edges of the control slides, even within the tolerance ranges, and differences in the deliveries of the pumps 5, 6 and in the intake volumes of the hydraulic motors 7, 8 arising from size tolerances and leakage losses. The differences in the outputs and speeds of the gears 1, 2 arising from the departures from the intended values can be above or below the desired (theoretical) value, depending on the nature of the departures from the intended values. The range of adjustment of the differential pressure valve 41 is chosen so that outputs both above and below the desired values can be corrected. Thus the pressure difference between the control pressure lines 23, 24 provided by the pressure reducing valve 26 can be either reduced or increased. The adjustment of the differential pressure valve 41 is performed in the installed position. Thus all departures from intended values can be allowed for and compensated.

Figure 4:
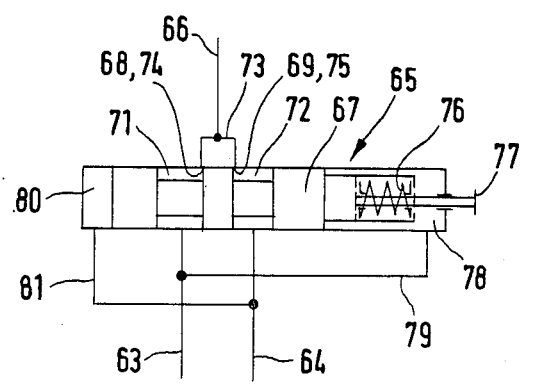
FIG. 4 shows a differential pressure valve according to FIG. 3 on a larger scale.
Figure 3:
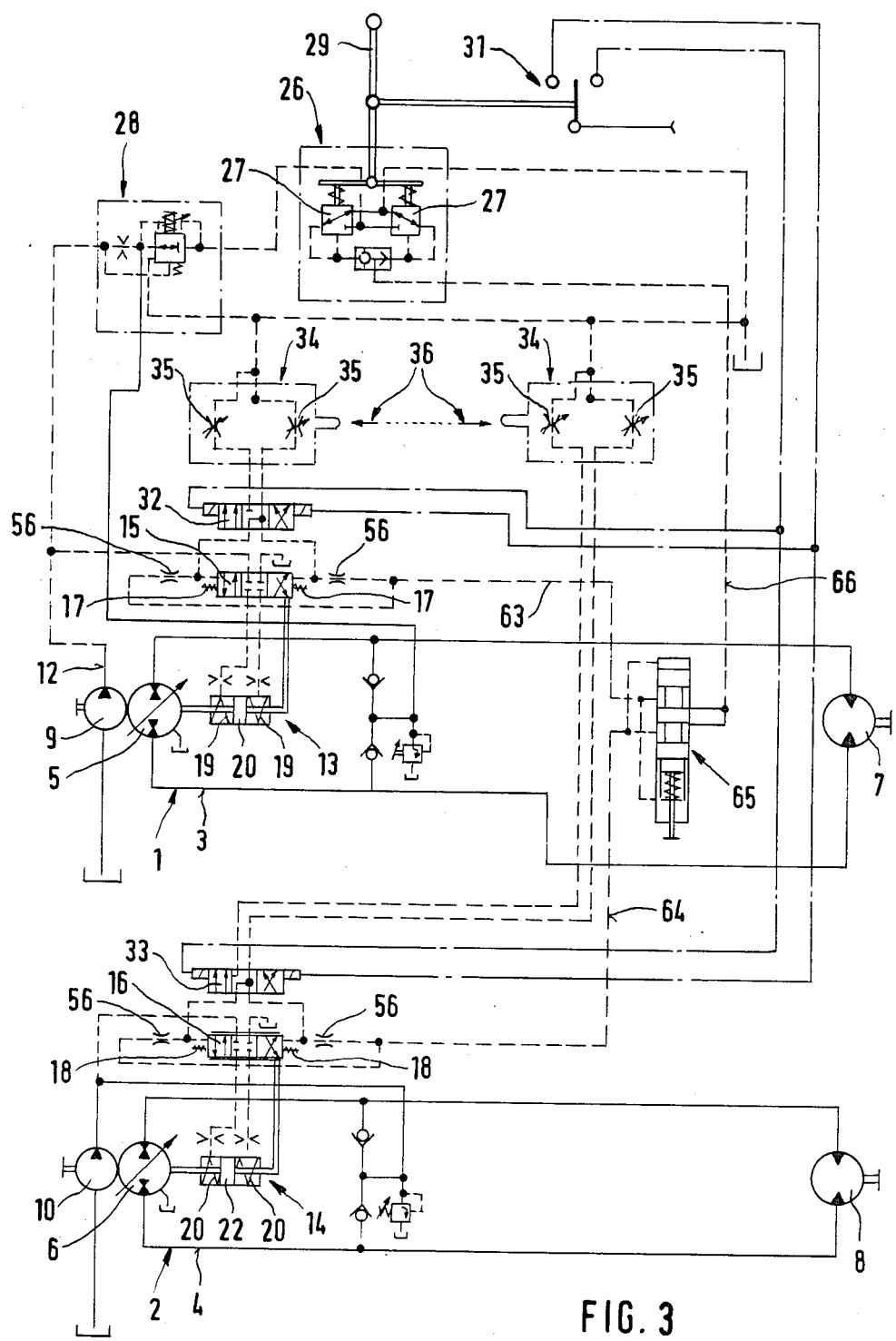
FIG. 3 shows a circuit diagram of a second embodiment of a drive system according to the invention.

The arrangement according to FIGS. 3 and 4 differs from that just described in that the control pressure lines 63, 64 leading to the servo-regulators 13, 14 are connected via a double-acting differential pressure valve 65 to a common control pressure line 66. Consequently, apart from the correction that can be made through the differential pressure valve 65, the servo-regulators 13, 14 are acted on by one and the same control pressure.

As is clearly shown in FIG. 4, the piston slide 67 of the differential pressure valve 65 has two control edges 68, 69 that form opposed radial surfaces of the recesses 71, 72 in the piston slide. In the region of the control edges 68, 69 the recesses 71, 72 in the piston slide are connected via a branch line 73 to the common control pressure line 66, so that variable chokes 74, 75 are formed in the region of the mouths of the branch line 73. In addition the recesses 71, 72 in the piston slide are connected via the control pressure lines 63, 64 to the servo-regulators 13, 14. Also in this arrangement the piston slide 67 is acted on on one side by a pressure spring 76 whose tension can be both reduced and increased by a control means 77. On this side the working space 78 is connected to the control pressure line via a line 79. The working space 80 on the other side of the piston slide 67 is connected to the control pressure line 64 via a line 81. The differential pressure valve 65 thus operates as a flow or pressure divider.

Figure 5:
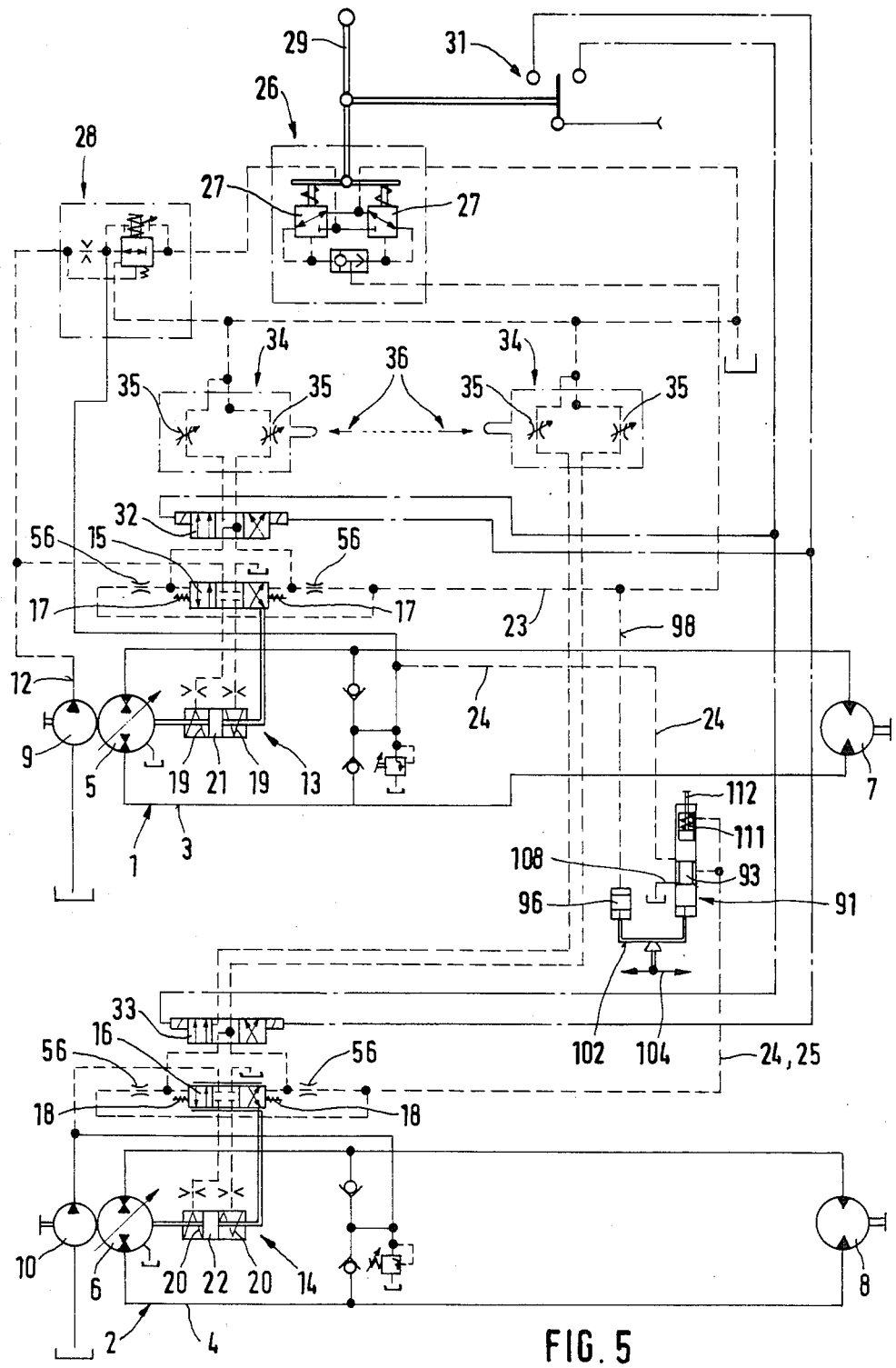
FIG. 5 shows a circuit diagram of a further embodiment of a drive system according to the invention.
Figure 6:
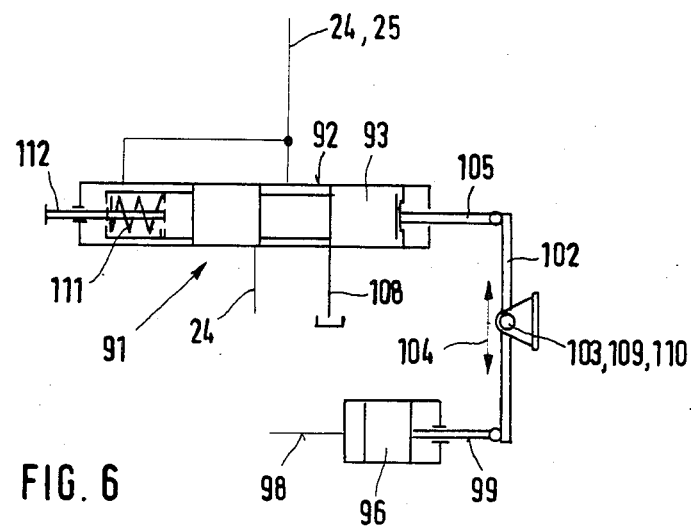
FIG. 6 shows a differential pressure valve according to FIG. 5 on a larger scale.

According to FIGS. 5 and 6 the differential pressure valve indicated by 91 comprises a piston slide 93 that is displaceable in a cylinder 92 and has a control edge 94 that cooperates with a control edge 95 on the housing 92 to form an adjustable choke. The differential pressure valve 91 is fitted with a piston 96 whose measuring face 97 can be acted on by the control pressure of the control pressure line 23 via a section 98 connected to the control pressure line 23. The piston 96 acts through a piston rod 99 on one arm 101 of a two-armed lever 102 of which the fulcrum 103 can be adjusted along the double arrow 104. The piston slide 93 acts on the other arm 100 of the lever through a piston rod 105. Connected in the region of the recesses 106, 107 in the piston on both sides of the control edges 94 are the section 25 of the control pressure line 24 and a drain line 108.

The piston slide 93 is urged against the lever 102 by a pressure spring 111, whose tension can be reduced or increased as desired by control means 112, which presses against the end of the piston slide 93 opposite the lever 102. The working space 113 provided at this end of the piston slide 93 and accommodating the pressure spring 111 is connected via openings 114 to the section 25 of the control pressure line 24 that holds the control pressure regulated by the differential pressure valve 91, so that the regulated control pressure of the control pressure line section 25 acts on the end faces of the control slide 93 made up of the end face sections 116 and 117. It should be added that the control pressure line 23 and the control pressure line section 25 are connected to the 4/3-way valves 15, 16 via chokes 56.

The lever 102 is mounted on an eccentric 109 of a shaft 110 mounted in the housing of the differential pressure valve 91. Turning the shaft 110 enables the fulcrum 103 to be displaced in a simple manner along the double arrow 104.

The pressure spring 111 is pretensioned between two shoulders of the piston slide 93 by means of sliding thrust rings 118, 119. In the pressure-free state the thrust rings 118, 119 lie on two inner shoulders 121, 122 of a casing 123 around the pressure spring 111 which is integrally connected to the control means 112, consisting of a threaded rod. Depending on the operating stage, the control slide 93 can be displaced in the casing 123 either so that the piston shoulder 124 is lifted from the thrust ring 118 and the thrust ring 119 is lifted from the inner shoulder 122, or the piston shoulder 125 is lifted from the thrust ring 119 and the thrust ring 118 is lifted from the inner shoulder 121.

As in the embodiment according to FIGS. 1 and 2, the purpose of the differential pressure valve 91 is to provide a pressure difference between the primary pressure in the control pressure line 23 and the control pressure in the section 25 of the control pressure line 24 leading to the 4/3-way valve 16 so as to correct the pressure difference between the control pressure lines 23, 25. This pressure difference can be varied as desired by varying the tension of the pressure spring 111 by the control means 112.

Figure 7:
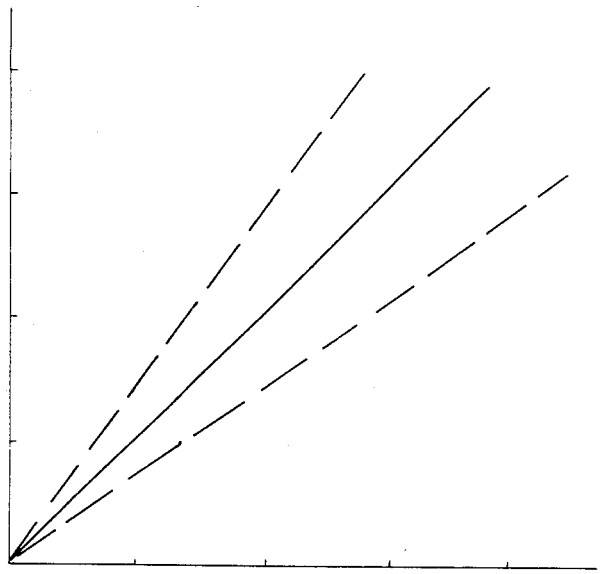
FIG. 7 is a diagram showing different spring characteristics.
Figure 8:
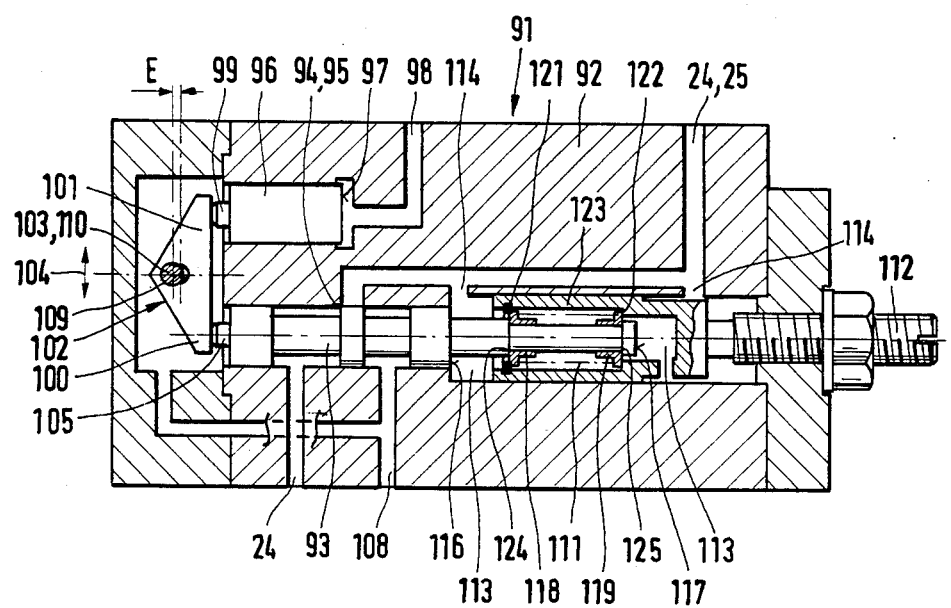
FIG. 8 shows, as a further embodiment of the invention, another arrangement of a differential pressure valve according to FIG. 5 in section and on a larger scale.

By moving the lever 102 along the double arrow 104 departures from the delivery or intake volume setting arising from differences in the characteristics of the springs 17, 18, 19 and 20 can be corrected. Characteristic curves of springs with different slopes are illustrated in FIG. 7.

Initial setting up of the drive, particularly of the differential pressure valves 41, 65, 91, can simply and quickly be performed by comparing the output speeds of the gears 1, 2. To do this, the output speeds are measured and the differential pressure valve 41, 65, 91 concerned is adjusted so as to increase or decrease the respective spring tension until the output speeds are the same. In the case of the differential pressure valve 91 according to FIGS. 5 to 8 the control means 112 and the eccentric 109, as the case may be, should be correspondingly adjusted.

What is claimed is:

1. A drive system having two hydrostatic gears driven by at least one driving motor means having a fixed speed ratio, each of said gears having a pump and a hydraulic motor; hydraulic servo-regulators for setting the delivery and intake volume setting of the pumps and of the hydraulic motors through control pressure lines; control pressure indicating valves for varying the control pressures in the control pressure lines being connected to each said gear and supplied by an auxiliary pressure source, characterized by an adjustable differential pressure valve being connected to the control pressure lines, which differential pressure valve is adjusted to compensate for differences in output of the gears in response to a corresponding change in the pressure in at least one of the control pressure lines.

2. A drive system according to claim 1, characterized in that the differential pressure valve comprises a piston slide, and a spring exerting an adjustable force acting on said slide for varying the position thereof.

3. A drive system according to claim 2, characterized in that a pressure reducing valve is connected between the control pressure lines, the differential pressure valve being arranged in one of the control pressure lines operating for the respective directions of travel, a measuring surface on the piston slide for pressure acting opposite to the force exerted by the spring is acted on via a line being subjected to the control pressure in the other said control pressure line, a surface on the piston slide for measuring pressure in the direction of the force exerted by the spring being acted on by the control pressure in said one control pressure line, and the piston slide comprises two control edges for controlling the cross-section of the said one control line and of a drain line connected thereto.

4. A drive system according to claim 2, characterised in that the differential pressure valve is a flow and pressure divider.

5. A drive system according to claim 4, characterised in that the piston slide of the differential pressure valve has two control edges on surfaces facing in two opposite directions, that these control edges form chokes with two connections of a branch line connected to the control circuit, that each control pressure line is connected to a choke, and that each control pressure line is connected to one of two oppositely operating working spaces at the ends of the cylinder accommodating the piston slide.

6. A drive system according to claim 2, characterized in that the differential pressure valve is fitted with a piston, the pressure in at least one control pressure line acting on said piston; and an adjustable transmission device acting on the piston slide in the opposite direction to the force exerted by the spring.

7. A drive system according to claim 6, characterised in that the transmission device is a transmission lever with an adjustable fulcrum.

8. A drive system according to claim 7, characterised in that the transmission lever is a two-armed lever on which the piston engages one arm and the piston slide engages the other arm.

9. A drive system according to claim 7, characterised in that the transmission lever is mounted on an eccentric of a rotatable shaft.

10. A drive system according to claim 6, characterised in that the piston slide is centered by the spring on the adjusting means that adjusts its operating force and position.

11. A drive system according to claim 10, characterized in that the spring is a pressure spring which is tensioned by thrust rings located between two opposed shoulders formed on the piston slide, the thrust rings being held axially between shoulders formed on adjustable transmission device.

* * * * *